(12) United States Patent
Lee

(10) Patent No.: US 9,438,131 B2
(45) Date of Patent: Sep. 6, 2016

(54) AC-DC CONVERTER

(71) Applicant: SAMSUNG ELECTRONICS CO., LTD., Suwon-si, Gyeonggi-do (KR)

(72) Inventor: Dong Hwan Lee, Gwacheon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 577 days.

(21) Appl. No.: 13/687,622

(22) Filed: Nov. 28, 2012

(65) Prior Publication Data

US 2013/0135911 A1 May 30, 2013

(30) Foreign Application Priority Data

Nov. 29, 2011 (KR) .......................... 10-2011-0126321

(51) Int. Cl.
*H02M 1/32* (2007.01)
*H02M 3/156* (2006.01)
*H02M 3/157* (2006.01)
*H02M 7/06* (2006.01)
*H02H 7/127* (2006.01)
*H02M 7/04* (2006.01)

(52) U.S. Cl.
CPC ............... *H02M 7/04* (2013.01); *Y02B 70/126* (2013.01)

(58) Field of Classification Search
CPC ................ H02M 1/32; H02M 7/062; H02M 3/156–3/157; H02H 7/127
USPC ................ 363/50, 52, 53; 323/282–283, 908
See application file for complete search history.

(56) References Cited

U.S. PATENT DOCUMENTS

| 6,493,245 | B1* | 12/2002 | Phadke | ................. H02H 9/001 323/908 |
| 6,714,429 | B2  | 3/2004  | Phadke | |
| 7,505,291 | B2* | 3/2009  | Wang   | .................... H02M 7/062 363/15 |
| 2002/0196644 | A1* | 12/2002 | Hwang | ............... H02M 1/0845 363/89 |
| 2006/0274468 | A1* | 12/2006 | Phadke | ................. H02M 7/125 361/93.1 |
| 2008/0310198 | A1  | 12/2008 | Chiang et al. | |
| 2011/0006748 | A1* | 1/2011  | Jang   | ........................ H02M 1/36 323/299 |

FOREIGN PATENT DOCUMENTS

KR    10-2001-0004178    1/2001

* cited by examiner

*Primary Examiner* — Timothy J Dole
*Assistant Examiner* — Sisay G Tiku
(74) *Attorney, Agent, or Firm* — Staas & Halsey LLP

(57) ABSTRACT

An alternating current to direct current (AC-DC) converter is provided. The converter includes a rectifying unit configured to rectify an AC voltage that is being input, a boost converter unit connected to the rectifying unit and provided with a single inductor, a first switch, and a second switch formed thereto, a smoothing unit configured to smooth the voltage passing through the boost converter unit, and a control unit configured to control an ON/OFF of the first switch and the second switch such that the boost converter unit is operated as a power factor correction circuit or as an inrush current limiting circuit, so that the inrush current is stably controlled by reducing additional circuit structures configured for limiting an inrush current.

12 Claims, 11 Drawing Sheets

AC-DC CONVERTER

CROSS-REFERENCE TO RELATED APPLICATIONS

This application is related to, and claims priority, to Korean Patent Application No. 2011-0126321, filed on Nov. 29, 2011, in the Korean Intellectual Property Office, the disclosure of which is incorporated herein by reference.

BACKGROUND

1. Field

Embodiments discussed herein relate to an AC-DC converter having an inrush current limiting function.

2. Description of the Related Art

In general, in electric/electronic apparatuses, to supply the voltage needed, an AC-DC converter (a power converting apparatus) capable of converting commercial AC power into a predetermined DC power for an output, may be used. The charge of a smoothing capacitor connected to an output of the AC-DC converter is about "0" (zero) before the AC power is supplied, but at the moment when the AC power is supplied to the AC-DC converter, the charge of the smoothing capacitor is turned into a state similar to the state of a short circuit, and thus a large inrush current, that is as small as tens of one ampere or greater than 100 amperes depending on a line impedance thereof, is generated.

The inrush current may be defined as the large amount of the current value that is temporarily generated in a circuit when power of an electric/electronic apparatus is turned on. When the large inrush current flows through the AC-DC converter and exceeding the limited peak current, damage may occur at a semiconductor device used at the AC-DC converter. Thus, the inrush current needs to be limited (controlled).

To limit the inrush current as such, two methods may be conventionally suggested.

FIG. 1A illustrates a conventional AC-DC converter having a current limiting function.

As illustrated on FIG. 1A, an AC-DC converter 1 includes an inrush current limiting circuit 20 configured to limit an inrush current, a diode bridge rectifier 30 configured to rectify an AC current, a boost converter 40 configured to correct a power factor, and a smoothing capacitor 50 configured to smooth the voltage passed through the boost converter 40.

The diode bridge rectifier 30 may be referred to as a bridge circuit with four diodes 32, 34, 36, and 38 connected thereto, and the diode bridge rectifier 30 is configured to output a voltage having the same polarity regardless of the polarity of input voltage.

The boost converter 40 includes an inductor 42, a switch 44, and a diode 46, and may be divided into two operations, such as a motion when the switch 44 is being turned ON and an operation when the switch 44 is being turned OFF. When the switch 44 is being turned ON, a current flows at an inductor L and energy is accumulated, and the energy accumulated at the smoothing capacitor 50 is consumed at the output terminal. As the switch 44 is being turned ON, the diode 46 blocks the charge of the smoothing capacitor 50 from flowing toward the switch 44. When the switch 44 is being turned OFF, the energy accumulated at the inductor 42 is added to an input voltage, such that the voltage passing through the diode 46 is increased as much as the energy accumulated (voltage) at the inductor 42.

The inrush current limiting circuit 20 includes a resistance 22 and a switch 24 connected in parallel to the resistance 22. As illustrated in FIG. 1A, when an AC voltage is input to the AC-DC converter 1 at the time when the switch 24, inside the inrush current limiting circuit 20, and the switch 44, inside the boost converter 40, are in an OFF state, the initial inrush current flows through the resistance 22 disposed at an AC input terminal, and the smoothing capacitor 50 disposed at the output terminal of the AC-DC converter 1 is charged. That is, by having the current, which flows at an initial stage of the input of the AC voltage, flow through the resistance 22 disposed at the AC input terminal, the size of the inrush current may be limited. If the charging at the smoothing capacitor 50 is completed after a predetermined time is passed, energy may be needlessly consumed at the resistance 22. Thus, by turning ON the switch 24 connected in parallel to the resistance 22 when the size of the current introduced to the smoothing capacitor 50 is decreased upon the completion of the charging at the smoothing capacitor 50, the current flowing to the resistance 22 may be blocked, and thereby energy consumption at the resistance 22 may be reduced.

FIG. 1B is a circuit diagram of a conventional AC-DC converter including an inrush current limiting circuit.

As illustrated on FIG. 1B, a AC-DC converter 2 includes a diode bridge rectifier 30 configured to rectify an AC voltage, a boost converter 40 configured to correct a power factor, a smoothing capacitor 50 to smooth the voltage passed through the boost converter 40, and an inrush current controlling circuit 60 configured to limit an inrush current. The AC-DC converter 2, instead of the resistance 22 and the switch 24 disposed at an AC input unit of the AC-DC converter 1 illustrated on FIG. 1A, is provided with a resistance 52 and a switch 54, which are connected in parallel to each other and connected in series to the smoothing capacitor 50 of a DC terminal. The inrush current limiting circuit 60 is provided with a resistance 62 disposed thereto to detect the current flowing at a rear end of the diode bridge rectifier 30, and detects the value of the current that flows at the resistance 62 by measuring the voltage droop generated when a current flows at the resistance 62.

When the initial power is supplied, the inrush current passes through the four diodes 32, 34, 36, and 38 at the diode bridge rectifier 30, the inductor 42, the diode 46, the smoothing capacitor 50, and the inrush current limiting resistance 52. After the initial power is supplied, an inside supplementary converter (not shown) is started, and the supplementary converter (not shown) generates a bias voltage Vcc for the inrush current limiting circuit 60. A comparator 64 is configured to turn ON a switch 54 only when the current flowing at the resistance 62 is less than a predetermined value. That is, in a case when the current flowing through the resistance 62 is greater than the value that is predetermined, by turning OFF the switch 54 connected to the DC terminal, such that the initially charged current flows through the resistance 52, and when the current flowing through the resistance 62 is less than the value that is predetermined, by turning ON the switch 54 connected to the DC terminal, the current does not flow through the resistance 52, thereby limiting the size of the inrush current. The AC-DC converter 2 illustrated in FIG. 1B may be configured to detect the size of the current introduced to an inside the circuit thereof, and limit the inrush current according to the value of the current that is detected. The AC-DC converter 1 illustrated in FIG. 1A may be used in reducing the size of the current introduced to the circuit thereof by using the resistance 22.

The AC-DC converter 1 illustrated on FIG. 1A is provided with the resistance 22 and the switch 24 disposed at the input terminal thereof to limit the inrush current, but the volume that is occupied by the resistance 22 and the switch is large. As the system is includes the capacitor 50 having a large capacity thereof, the size and capacity of the switch 24 needs to be large as well. In addition, a relay, which is conventionally used as the switch 24, is provided with a mechanical contact point, where loss of energy is generated.

Since the AC-DC converter 2 illustrated on FIG. 1B includes the resistance 62 to measure, the size of the current introduced to an inside the circuit thereof, power consumption occurs at the resistance 62 and conducting loss occurs at the switch 54 of the DC terminal.

Since the control structure configured to limit the inrush current is embodied as a circuit in the AC-DC converter 2, additional circuit devices are used at the AC-DC converter 2 than with the AC-DC converter 1 illustrated on FIG. 1A. In addition, in order to control (change) the inrush current limiting unit 60 having various circuit devices or to add new functions to the inrush current limiting unit 60, an improved inrush current limiting unit 60 is needed.

SUMMARY

It is an aspect of an exemplary embodiment of the present invention to provide an AC-DC converter in which a boost converter, which is configured to correct the power factor is modified, such that the boost converter is used as an inrush current limiting circuit, and a control block to limit an inrush current is added to an inside a micro computer that is configured to control the power factor correction circuit, thereby stably controlling the inrush current while decreasing the circuit device for the inrush current limiting.

It is an aspect of an exemplary embodiment of the present invention to provide an AC-DC converter in which a boost converter, which is configured to correct the power factor is modified, such that the boost converter is used as an inrush current limiting circuit, and a control block to limit an inrush current is added to an inside a micro computer that is configured to control the power factor correction circuit, the boost converter may be used as a power factor correction circuit or an inrush limiting circuit depending on the control mode.

It is an aspect of an exemplary embodiment of the present invention to provide an AC-DC converter capable of reducing power loss by reducing the use of a resistance component when compared to a conventional technology in forming an inrush current limiting circuit.

It is an aspect of an exemplary embodiment of the present invention to provide an AC-DC converter capable of easily changing and extending a control scheme while minimizing adding circuit devices, by embodying a control block to generate a control signal at a micom without forming a circuit to generate a control signal.

Additional aspects will be set forth in part in the description which follows and, in part, will be obvious from the description, or may be learned by practice of the disclosure.

In accordance with an aspect of an exemplary embodiment of the present invention, an alternating current to direct current (AC-DC) converter includes a rectifying unit, a boost converter unit, a smoothing unit and a control unit. The rectifying unit may be configured to rectify an AC voltage that is being input. The boost converter unit may be connected to the rectifying unit and provided with a single inductor, a first switch, and a second switch formed thereto. The smoothing unit may be configured to smooth the voltage passing through the boost converter unit. The control unit may be configured to control an ON/OFF of the first switch and the second switch such that the boost converter unit is operated as a power factor correction circuit or as an inrush current limiting circuit.

The control unit may include a power factor control block, an inrush current control block and a multiplexer. The power factor control block may generate an ON/OFF control signal of the first switch and the second switch such that the boost converter unit performs a power factor controlling mode that operates as the power factor correction circuit. The inrush current control block may be configured to generate an ON/OFF control signal of the first switch and the second switch such that the boost converter unit performs an inrush current controlling mode that operates as the inrush current limiting circuit. The multiplexer may be configured to select one of the control signal generated through the power factor control block and the control signal generated through the inrush current control block, and to transmit the selected signal to the first switch and the second switch.

The inrush current control block may include a first switch control signal generator to generate the ON/OFF control signal of the first switch, and a second switch control signal generator to generate the ON/OFF control signal of the second switch. The second switch control signal generator may include a reference signal generator, a carrier signal generator, and a comparator. The reference signal generator may be configured to generate a reference signal that is increased in amplitude, and maintains a certain value in amplitude after a predetermined time. The carrier signal generator may be configured to generate a carrier signal in a shape of a triangular wave having a fixed frequency. The comparator may be configured to generate a control signal of the second switch by comparing the reference signal with the carrier signal.

The inrush current control block may further include a timer configured to generate a mode changing signal to change from the inrush current controlling mode to the power factor controlling mode if an established time is passed from a point of time when the reference signal is started with maintaining the certain value.

When the inrush current controlling mode is performed, the first switch control signal generator generates an OFF control signal of the first switch.

When the inrush current controlling mode is performed, the comparator at an inside the second switch control signal generator may generate an ON control signal of the second switch if the reference signal is larger than the carrier signal, and if the reference signal is equal to or smaller than the carrier signal, the comparator at an inside the second switch control signal generator generates an OFF control signal of the second switch.

The inrush current control block may include a first switch control signal generator to generate the ON/OFF control signal of the first switch, and a second switch control signal generator to generate the ON/OFF control signal of the second switch. The second switch control signal generator includes a reference signal generator, a carrier signal generator and a comparator. The reference signal generator may be configured to generate a reference signal in a form of a step that maintains a predetermined value in amplitude, and changes to a certain value in amplitude after a predetermined time is passed. The carrier signal generator may be configured to generate a carrier signal in a shape of a triangular wave having a variable frequency. The comparator may be configured to generate a control signal of the second switch by comparing the reference signal with the carrier signal.

The inrush current control block may further include a timer configured to generate a mode changing signal to change from the inrush current controlling mode to the power factor controlling mode if an established time is passed from a point of time when the reference signal is started changing to a value that is greater than the predetermined value.

When the inrush current controlling mode is performed, the first switch control signal generator may generate an OFF control signal of the first switch.

When the inrush current controlling mode is performed, the comparator at an inside the second switch control signal generator may generate an ON control signal of the second switch if the reference signal is larger than the carrier signal, and if the reference signal is equal to or smaller than the carrier signal, the comparator inside the second switch control signal generator may generate an OFF control signal of the second switch.

The rectifying unit may be formed with a diode bridge.

Each of the first switch and the second switch may be implemented using an Insulated Gate Bipolar Transistor (IGBT).

According to an exemplary embodiment of an AC-DC converter, by modifying a conventional boost converter for the power factor correction to use as an inrush current limiting circuit and by adding a control block to limit an inrush current at an inside a micro computer configured to control a conventional power factor correction circuit, the inrush current may be stably controlled while reducing additional circuit structure to limit an inrush current.

According to an exemplary embodiment of an AC-DC converter, by modifying a boost converter to use as an inrush current limiting circuit and by adding a control block to limit an inrush current at an inside a micro computer configured to control a conventional power factor correction circuit, the boost converter may be used as a power factor correction circuit or an inrush current limiting circuit.

In addition, according to an exemplary embodiment of an AC-DC converter, with reference to structuring an inrush current limiting circuit, by reducing the use of a resistance component when compared to a conventional use thereof, power loss may be reduced.

In addition, according to an exemplary embodiment of an AC-DC converter, without structuring a component unit, which is configured to generate a control signal, as a circuit, but as a control block at an inside a micro computer, changing and expanding a control method without having to add a circuit apparatus may be easily performed.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1A:
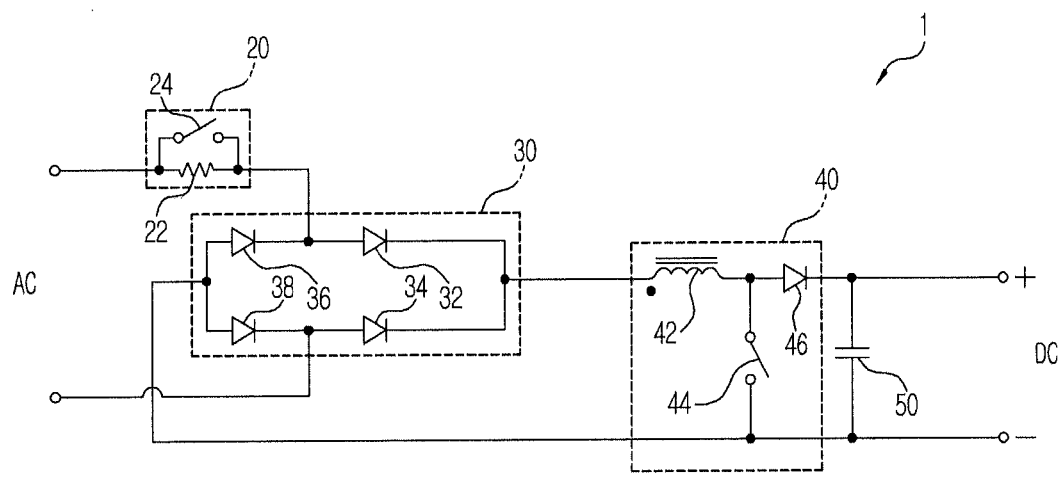
FIGS. 1A to 1B illustrate conventional AC-DC converters having an inrush current limiting function.

Reference will now be made in detail to the embodiments of the present disclosure, examples of which are illustrated in the accompanying drawings, wherein like reference numerals refer to like elements throughout.

Figure 2:
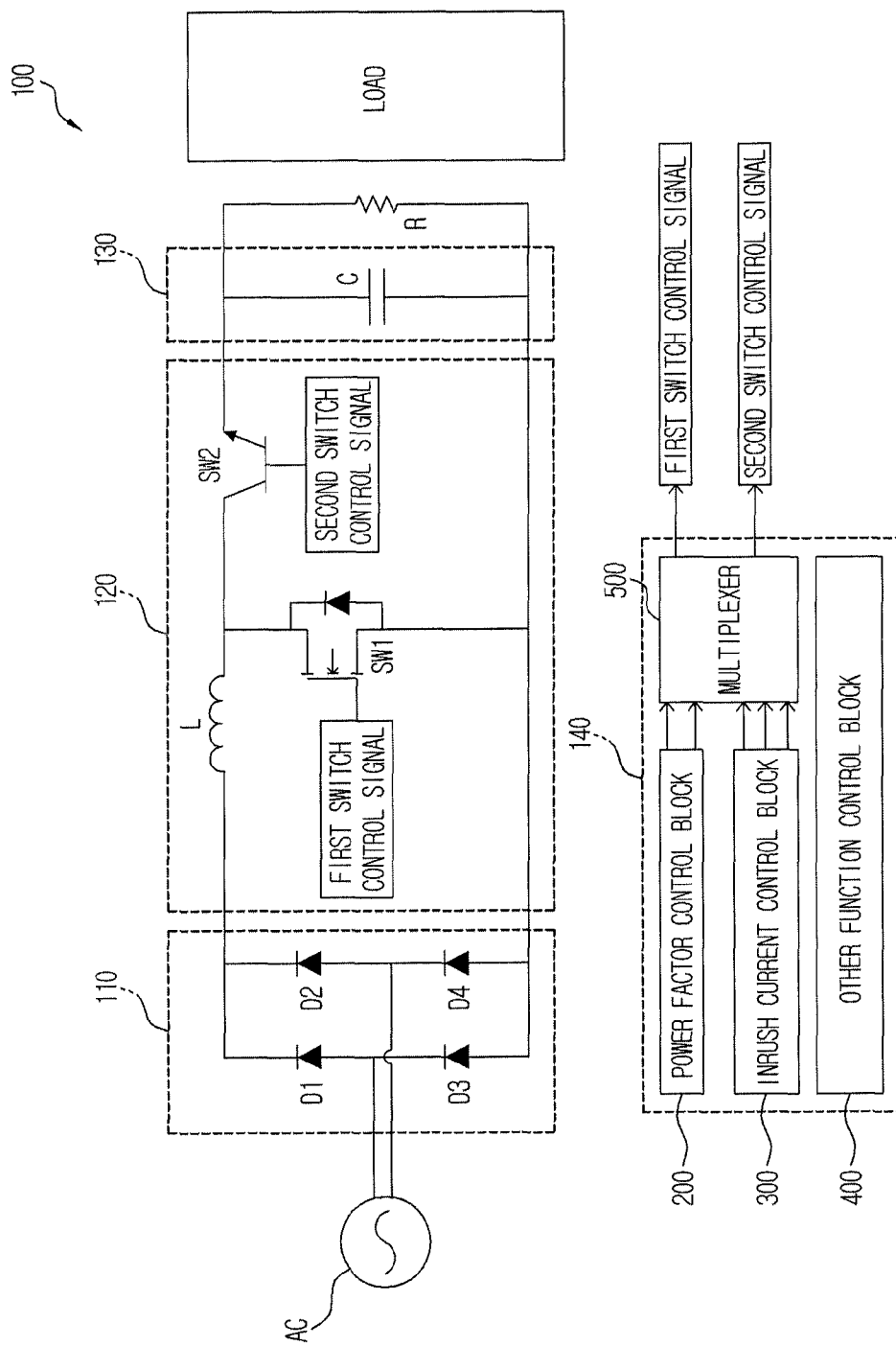
FIG. 2 illustrates an AC-DC converter in accordance with an exemplary embodiment of the present invention.

FIG. 2 illustrates an AC-DC converter in accordance with an exemplary embodiment of the present disclosure.

As illustrated on FIG. 2, an AC-DC converter 100 in accordance with an exemplary embodiment includes a rectifying unit 110, a boost converter unit 120, a smoothing unit 130, and a control unit 140.

The rectifying unit 110 rectifies an AC current that is input from an AC-DC power unit (AC). The rectifying unit 110 may be formed with a diode bridge. The diode bridge 110 may be referred to as a bridge circuit having four diodes D1, D2, D3, and D4 connected to one another, and outputs a voltage having the same polarity regardless of the polarity of voltage input thereto.

Figure 1B:
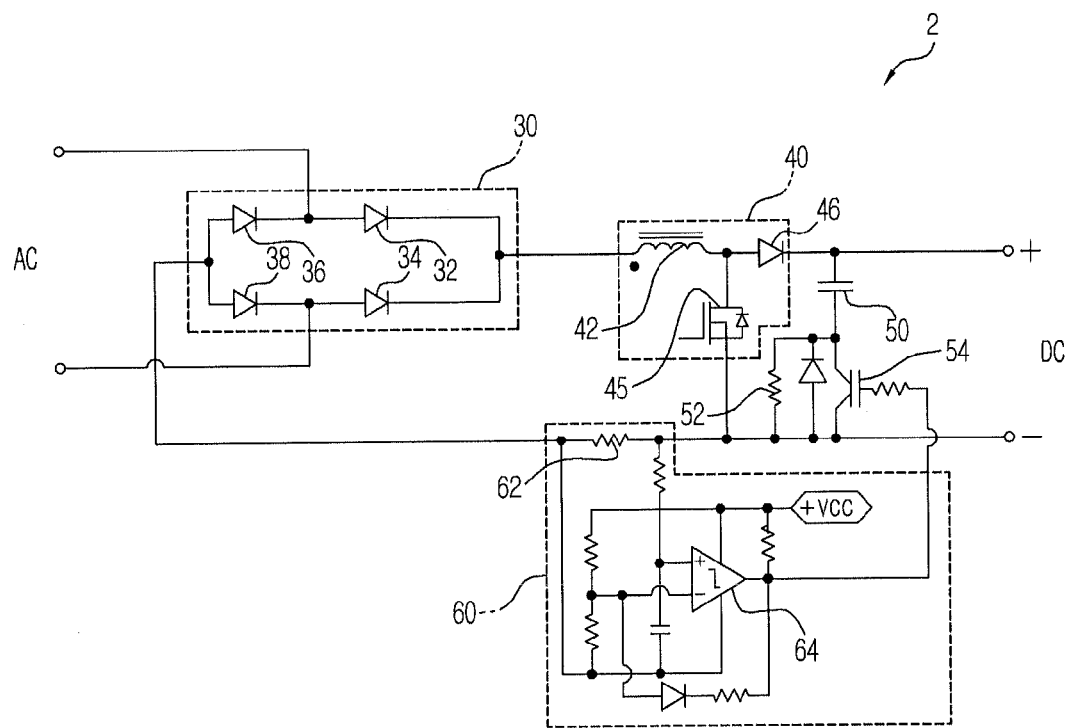

The boost converter unit 120 is connected to the rectifying unit 110, and replaces a diode 46 of the conventional boost converter 40, which is illustrated on FIGS. 1a to 1b with a power switch. That is, the boost converter unit 120 is formed with an inductor L, a first switch SW1, and a second switch SW2. The conventional boost converter circuit 40 uses a single switch (44 in FIG. 1A and 45 in FIG. 1B), and a single diode 46, while the boost converter unit 120 illustrated in an exemplary embodiment of the present invention uses two switches SW1 and SW2. For the first switch SW1 and the second switch SW2, an Insulated Gate Bipolar Transistor (IGBT) or other suitable transistor may be used.

In the conventional boost converter 40, in a case when the switch (44 in FIG. 1A) or the switch (45 in FIG. 1B) is in an OFF state, a current flows at the diode 46. At the boost converter unit 120 illustrated in exemplary embodiment of the present invention, in a case when the first switch SW1 is in an OFF state, if the second switch SW2 is controlled so that a current flows through the second switch SW2, the boost converter unit 120 may also operate as a power factor correction (PFC) circuit such as the conventional boost converter 40.

The smoothing unit 130 smoothes the voltage passing through the boost converter unit 120, and generates a DC voltage. The smoothing unit 130 may be formed with a capacitor C having a relatively large capacitance.

The control unit 140 represents a micro computer configured to control the overall operation of the AC-DC converter 100, and the control unit 140 includes a power factor control block 200 to correct a power factor, an inrush current control block 300 to limit the inrush current, an other function control block 400 having other functions implemented thereon other than the power factor correcting function and the inrush current limiting function, and a multiplexer 500 to selectively output the control signals that are input from the power factor control block 200 and the inrush current control block 300 such that the boost converter unit 120 operates as the power factor correction circuit or the inrush current limiting circuit. A first switch control signal that is output through the multiplexer 500 controls the ON/OFF of the first switch SW1, and a second switch control signal controls the ON/OFF of the second switch SW2. A state of the boost converter unit 120 operating as the power factor correcting circuit may be defined as a power factor correcting circuit, and a state of the boost converter unit 120 operating as the inrush current limiting circuit may be defined as an inrush current controlling mode.

The controlling to operate the boost converter unit 120 may be performed by structuring a control circuit or through a micro computer. Rather than structuring a control circuit to operate the boost converter unit 120 as the inrush current limiting circuit separately from the control circuit to operate the boost converter unit 120 as the power factor correction circuit, the controlling to operate the boost converter unit 120 may be performed through the micro computer such that, through the single micro computer, controlling the operations of the two circuits (the power factor correction circuit and the inrush current limiting circuit) may be more efficient. In an exemplary embodiment of the present invention, the power factor controlling block 200 configured to correct the power factor and the inrush current control block 300 configured to limit the inrush current may be inside the micro computer, and through the single micro computer, the case of the boost converter unit 120 operating as the power factor correction circuit and the case of the boost converter unit 120 operating as the inrush current limiting circuit are both controlled.

FIGS. 3 to 8 illustrate the power factor correction circuit 300, the inrush current control block 300 to limit the inrush current, and the multiplexer 500, which form the control unit 140 in cooperation with one another. The inrush current control block 300, the power factor control block 200 and the multiplex 500 are described.

Figure 3:
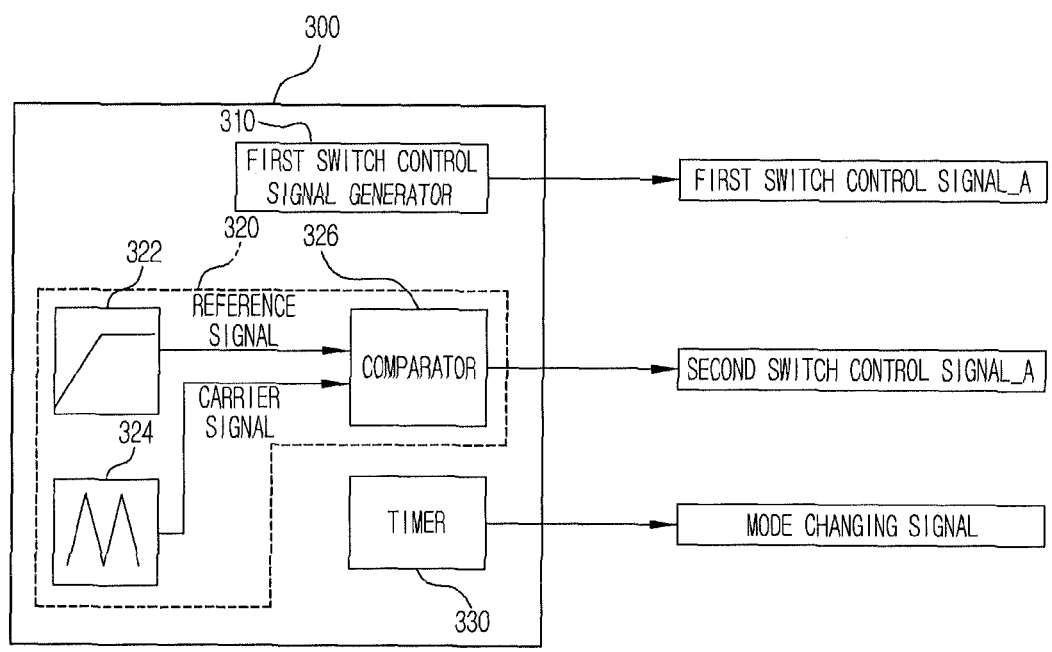
FIG. 3 illustrates an exemplary inrush current control block.
Figure 4:
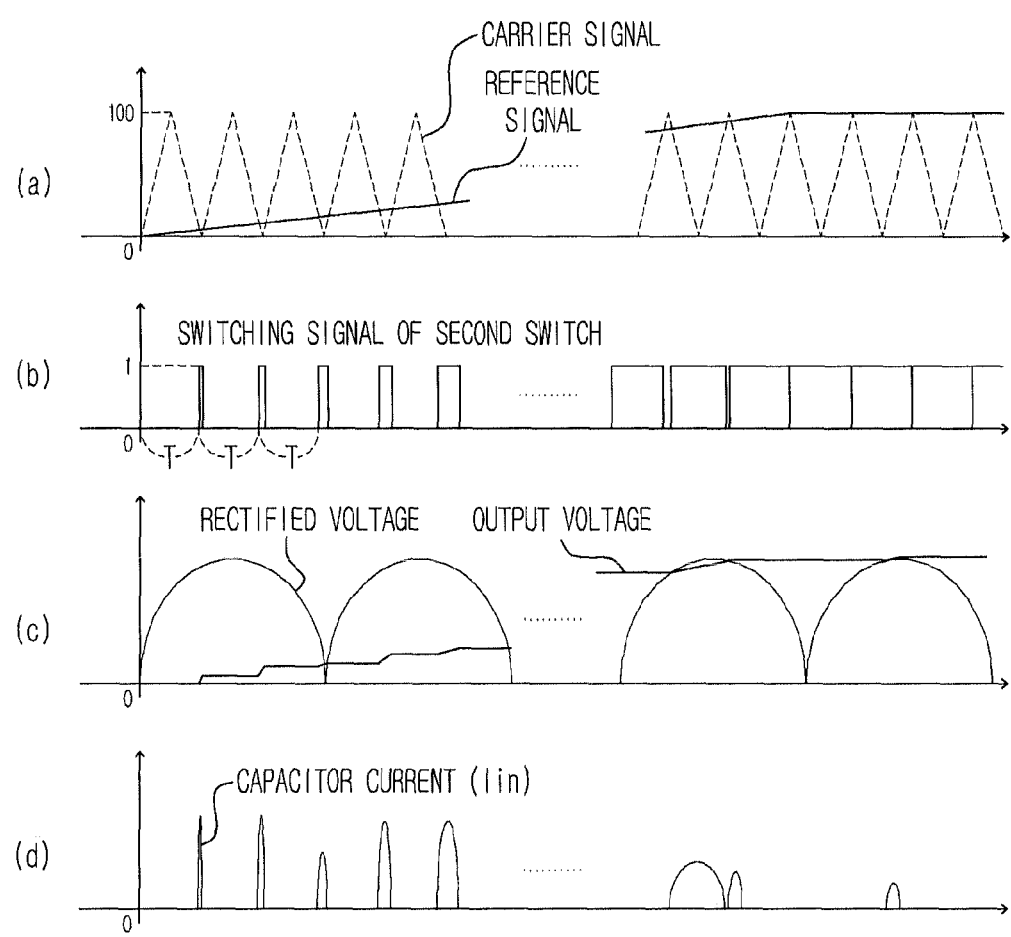
FIGS. 4A-4D illustrate various exemplary waveforms to describe a method of limiting an inrush current by using an exemplary inrush current control block.

FIG. 3 illustrates an exemplary inrush current control block. The inrush current control block 300 may be referred to as a block that generates a switching control signal when the boost converter unit 120 is operated as the inrush current limiting circuit. A "first switch control signal_A" is referred to as a first switch control signal that is generated from the inrush current control block 300, and "second switch control signal_A" is referred to as a second switch control signal that is generated at the inrush current control block 300

As illustrated on FIG. 3, the inrush current control block 300 includes a first switch control signal generator 310, a second switch control signal generator 320, and a timer 330.

The first switch control signal generator 310 generates a control signal to control the ON/OFF of the first switch SW1. In FIG. 2, when the first switch SW1 connecting the inductor L to a ground GND is in the ON state, the inductor L accumulates energy. When the boost converter unit 120 is operated as the inrush current limiting circuit, the first switch SW1 is not needed to be operated. Thus, the first switch control signal generator 310, in order to turn OFF the first switch SW1, generates a control signal "0" (zero) as the first switch control signal_A, (that is, the first switch control signal_A=0).

The second switch control signal generator 320 generates a control signal to control the ON/OFF of the second switch SW2. The second switch control signal generator 320 is composed of by including a reference signal generator 332, a carrier signal generator 324, and a comparator 326.

To limit the inrush current, the second switch SW2 is needed to be controlled, and a control signal of the second switch SW2 is generated by comparing a reference signal with a carrier signal.

Referring to FIG. 4A, the reference signal generator 322 generates a reference signal that is gradually increased in the size thereof as time passes from about "0" (zero), and after a predetermined time is passed, maintains at a certain value (ex: 100).

Referring to FIG. 4A, the carrier signal generator 324 generates a carrier signal that is provided in the shape of a triangular wave having a certain frequency and a size (amplitude) that continues increasing and decreasing in between about "0" (zero) and a certain value (ex: 100).

The comparator 326 compares the reference signal generated through the reference signal generator 322 with the carrier signal generated through the carrier signal generator 324, and if the reference signal is larger than the carrier signal, a signal "1" is output as the second switch control signal_A (the second switch control signal_A=1), and if the reference signal is smaller than or equal to the carrier signal, a signal "0" is output as the second switch control signal_A (the second switch control signal_A=0). At this time, the signal "1" output from the comparator 326 is referred to as an ON control signal of the second switch, and the signal "0" output from the comparator 326 is referred to as an OFF control signal of the second switch.

Referring to FIG. 4B, the output signal of the comparator 326, that is, the control signal (a switching signal) of the second switch SW2 may be represented as a Pulse Width Modulation (PWM) waveform having a predetermined period T, and the duty ratio of the switching signal of the second switch SW2 may be in a range of about 0% to 100% as the amplitude of the reference signal is increased.

As illustrated in FIG. 4A, the reference signal may be formed in a way that the amplitude thereof is gradually increased. After the amplitude thereof is reached at a certain valve (ex: 100) as a predetermined time is passed, the second switch SW2 continuously maintains at the ON state, as illustrated on FIG. 4b, and thus a current flows at the capacitor C until the voltage Vrect rectified through the rectifying unit 110 and the charging voltage Vdc (the output voltage) of the capacitor C are about same.

The timer 330, if a predetermined time is passed from the point of when the amplitude of the reference signal is started maintaining a certain value (ex: 100), generates a mode changing signal to change from a inrush current controlling mode to a power factor controlling mode. The timer 330, as a predetermined time is passed from the point of when the amplitude of the reference signal is started maintaining a certain value (ex: 100), outputs a signal "1" (a mode changing signal=1) as the mode changing signal, and if as a predetermined time is not passed from the point of when the amplitude of the reference signal is started maintaining a certain value (ex: 100), outputs a signal "0" (a mode changing signal=0) as the mode changing signal. When the power is initially supplied to the AC-DC converter 100, in order to limit the size of the initial inrush current, the boost converter unit 120 performs the inrush current limiting mode, and thus, in a case of supplying the initial power, that is, at the time of when the AC-DC converter 100 is started to operate, the mode changing signal is set at "0" (zero). The timer 330 outputting a signal "1" as the mode changing signal may be referred to as the control mode of the boost converter unit 120 and changed from the inrush current limiting mode to the power factor controlling mode.

FIGS. 4A-4D illustrates various waveforms to describe a method of limiting an inrush current by using an exemplary inrush current control block illustrated in FIG. 3.

The comparator 326 generates a switching signal to control the second switch SW2 by comparing the reference signal that is generated through the reference signal generator 322 with the carrier signal that is generated through the carrier signal generator 324. When the control signal (the switching signal) of the second switch SW2 is "1", that is, only when the second switch SW2 is turned ON, a current flows to the capacitor C, and as illustrated in FIG. 4C and FIG. 4D, the size of the current that flows at the capacitor C may be determined by the difference between the rectified voltage Vrect that is rectified through the rectifying unit 110 and the charging voltage Vdc of the capacitor C, as well as by the time constant of the inductor L and the capacitor C. When the initial power is supplied, that is, when the difference between the rectified voltage Vrect that is rectified through the rectifying unit 110 and the charging voltage Vdc of the capacitor C is large, the size of the inrush current also is large, and thus, the switching time of the second switch SW2 may be set to be short to limit the size of the inrush current. After a certain amount of voltage is charged at the capacitor C, the difference between the rectified voltage Vrect that is rectified through the rectifying unit 110 and the charging voltage Vdc of the capacitor C is not large, and thus, the size of the current that flows at the capacitor C is not greatly increased. Thus, as illustrated in FIG. 4B, the switching time of the second switch SW2 is gradually increased, and the duty rate of the switching signal of the second switch SW2 may be increased to about 100%, so that the charging voltage Vdc of the capacitor C is reached at the peak value of the rectified voltage Vrect. After the charging voltage Vdc (the output voltage) is reached at the peak value of the rectified voltage Vrect, the mode changing signal may be changed from "0" to "1", so that the boost converter unit 120 may be operated as the power factor correction circuit. In an exemplary embodiment, a point of time when a predetermined time is passed after the size of the reference signal is started maintaining a certain value (ex: 100) may be set as the point of time when the inrush current controlling mode is changed to the power factor controlling mode (the point of time when the mode changing signal is changed from "0" to "1").

Figure 5:
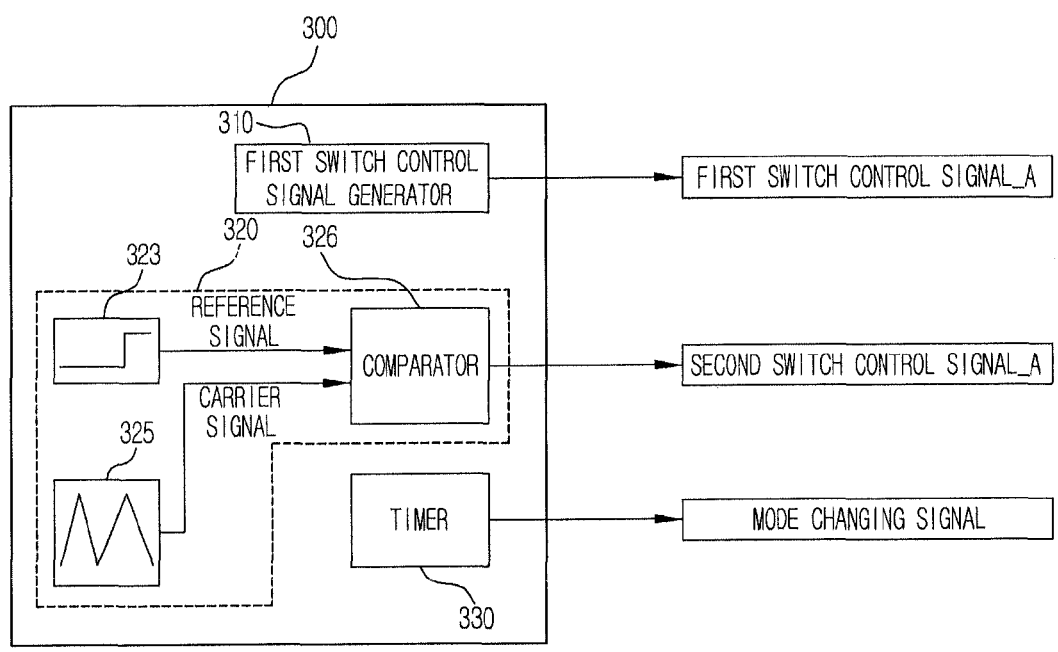
FIG. 5 illustrates an exemplary inrush current control block.
Figure 6:
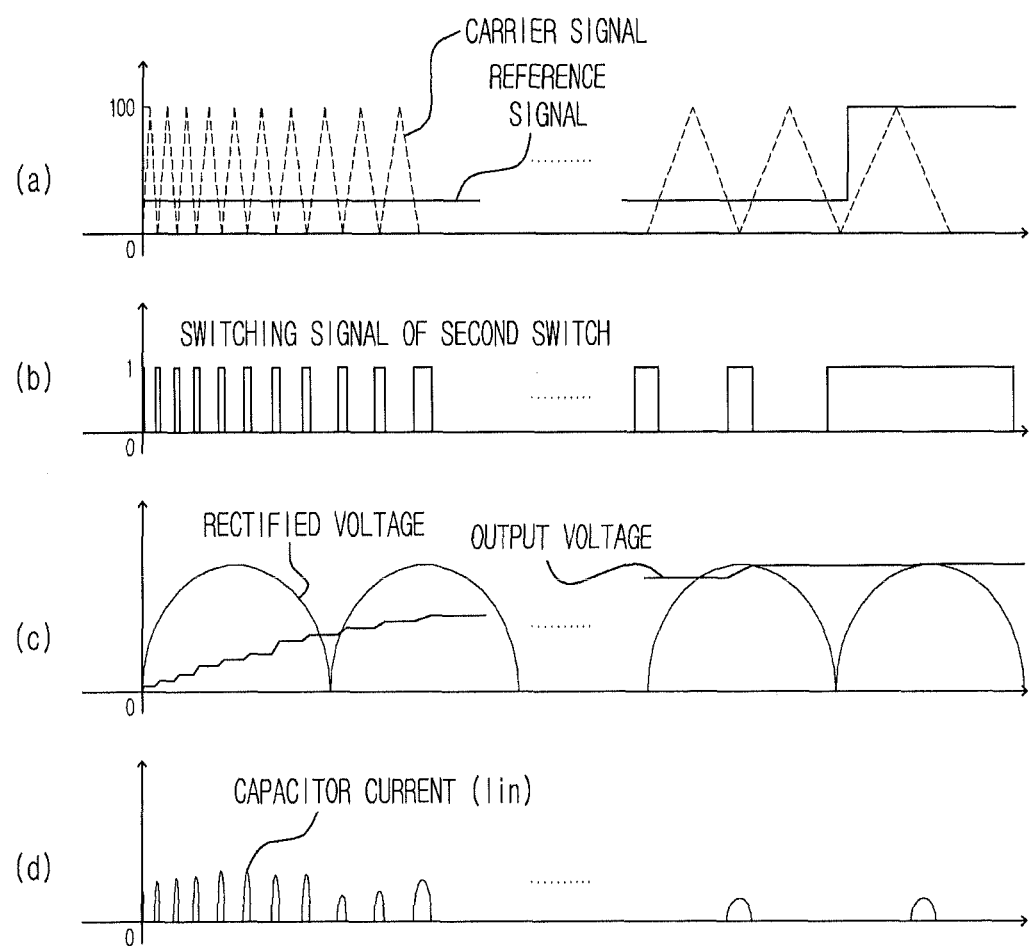
FIGS. 6A-6D illustrate exemplary various waveforms of signals to describe a method of limiting an inrush current by using an exemplary inrush current control block.

FIG. 5 illustrates an exemplary inrush current control block. As illustrated in FIG. 5, a reference signal and a carrier signal, which are used at the second switch control signal generating unit 320 of the inrush current control block 300, are different from the reference signal and the carrier signal, which are used at the second switch control signal generating unit 320 of the inrush current control block 300 illustrated on FIG. 3.

As illustrated in FIG. 5, the inrush current control block 300 includes the first switch control signal generator 310, the second switch control signal generator 320, and the timer 300.

The first switch control signal generator 310 generates a control signal to control the ON/OFF of the first switch SW1. In FIG. 2, when the first switch SW1 connecting the inductor L to the ground GND is in the ON state, the inductor L accumulates energy, and when the boost converter unit 120 is operated as the inrush current limiting circuit, the first switch SW1 is not needed to be operated. Thus, the switch control signal generator 310, in order to turn OFF the first switch SW1, generates a control signal "0" (zero) as the first switch control signal, and outputs (that is, the first switch control signal_A=0).

The second switch control signal generator 320 generates a control signal to control the ON/OFF of the second switch SW2. The second switch control signal generator 320 is composed of by including a reference signal generator 332, a carrier signal generator 325, and a comparator 326.

To limit the inrush current, the second switch SW2 should be controlled, and the control signal of the second switch SW2 is generated by comparing the reference signal with the carrier signal.

The reference signal generator 323, as illustrated in FIG. 6A, generates a reference signal (see, the solid line illustrated on FIG. 6a) provided in form of a step signal that maintains a predetermined amplitude thereof, and changes the amplitude thereof to a certain value (ex: 100) after a predetermined time is passed.

The carrier signal generator 325, as illustrated in FIG. 6A, generates a carrier signal (see, the dotted line illustrated in FIG. 6A) provided in a shape of a triangular wave having a variable frequency and an amplitude that continues the increasing/decreasing in between about "0" (zero) and a certain value (ex: 100).

The comparator 326 compares the reference signal generated through the reference signal generator 322 with the carrier signal generated through the carrier signal generator 325, and if the reference signal is larger than the carrier signal, a signal "1" is output as the second switch control signal_A (the second switch control signal_A=1), and if the reference signal is smaller than or equal to the carrier signal, a signal "0" is output as the second switch control signal_A (the second switch control signal_A=0). The signal "1" that is output from the comparator 326 is referred to as an ON control signal of the second switch, and the signal "0" that is output from the comparator 326 is referred to as an OFF control signal of the second switch.

The output signal of the comparator 326, that is, the control signal (a switching signal) of the second switch SW2, as illustrated in FIG. 6B, is represented as a Pulse Width Modulation (PWM) waveform having a predetermined duty ratio. The period of the switching signal of the second switch SW2 is increased, as the frequency of the carrier signal is decreased.

As illustrated in FIG. 6A, the reference signal is formed while having a form of a step signal that maintains the amplitude thereof at a predetermined value, and changes the amplitude thereof to a certain value (ex: 100) after a predetermined time is passed. After the predetermined time is passed and the amplitude thereof is changed to a certain value (ex: 100), the second switch SW2 continuously maintains at the ON state, as illustrated in FIG. 6B, and thus a current flows at the capacitor C until the voltage Vrect rectified through the rectifying unit 110 and the charging voltage Vdc (the output voltage) of the capacitor C are about same.

The timer 330, as a predetermined time is passed from the point of when the amplitude of the reference signal is started maintaining a certain value (ex: 100), generates a mode changing signal to change from the inrush current controlling mode to the power factor controlling mode. The timer 330, as a predetermined time is passed from the point of when the amplitude of the reference signal is started maintaining a certain value (ex: 100), outputs a signal "1" (a mode changing signal=1) as the mode changing signal, and if a predetermined time is not passed from the point of when the size of the reference signal is started maintaining a certain value (ex: 100), outputs a signal "0" (a mode changing signal=0) as the mode changing signal. When the initial power is supplied to the AC-DC converter 100, in order to limit the size of the initial inrush current, the boost converter unit 120 is needed to perform the inrush current limiting mode, and thus, in a case of supplying the initial power, that is, at the time of when the AC-DC converter 100 is started to operate, the mode changing signal is set at "0" (zero). Outputting a signal "1" as the mode changing signal may be referred to as the control mode of the boost converter unit 120 and changed from the inrush current limiting mode to the power factor controlling mode.

FIGS. 6A-6D illustrate various exemplary waveforms of signals to describe a method of limiting an inrush current by using an inrush current control block.

The comparator 326 generates a switching signal to control the second switch SW2 by comparing the reference signal that is generated through the reference signal generator 322 with the carrier signal that is generated through the carrier signal generator 325. When the control signal (the switching signal) of the second switch SW2 is "1", that is, only when the second switch SW2 is turned ON, a current flows to the capacitor C, and as illustrated in FIG. 6C and FIG. 6D, the amplitude of the current that flows at the capacitor C may be determined by the difference between the rectified voltage Vrect that is rectified through the rectifying unit 110 and the charging voltage Vdc of the capacitor C, as well as the time constant of the inductor L and the capacitor C. At the time of the initial power is supplied, that is, when the difference between the rectified voltage Vrect that is rectified through the rectifying unit 110 and the charging voltage Vdc of the capacitor C is large, the amplitude of the inrush current also is large, and thus, the switching time of the second switch SW2 is set to be short to limit the size of the inrush current. After a certain amount of voltage is charged at the capacitor C, the difference between the rectified voltage Vrect that is rectified through the rectifying unit 110 and the charging voltage Vdc of the capacitor C is not large, and thus, the amplitude of the current that flows at the capacitor C is not greatly increased. Thus, as illustrated in FIG. 6B, the switching time of the second switch SW2 is gradually increased, and, the switching signal of the second switch SW2 is set at 1, so that the charging voltage Vdc of the capacitor C is reached at the peak value of the rectified voltage Vrect. After the charging voltage Vdc (the output voltage) of the capacitor C is reached at the peak value of the rectified voltage Vrect, the mode changing signal is changed from "0" to "1", so that the boost converter unit 120 may be operated as the power factor correction circuit. In an exemplary embodiment, the point of time when a predetermined time is passed after the amplitude of the reference signal is started maintaining a certain value (ex: 100) may be set as the point of time when the inrush current controlling mode is changed to the power factor controlling mode (the point of time when the mode changing signal is changed from "0" to "1").

At the initial stage of the operation of the AC-DC converter 100, the capacitor C of the output unit is not charged, and thus, when the AC power is supplied, the inrush current is generated to charge the capacitor C, and the amplitude of the inrush current becomes larger as the capacitance of the capacitor C is larger and the voltage of the power supplied is larger. The current that flows to the capacitor C of the output terminal may be controlled by the second switch SW2. Accordingly, if the second switch SW2 and the first switch SW1 are turned OFF when the initial power is supplied, a current does not flow to the capacitor C of the output terminal. To charge the capacitor C of the output terminal, if a current in a form of a pulse wave is put to flow at the capacitor C through the switching control of the second switch SW2, the maximum value of the current introduced to the capacitor C may be limited, and the rapid increase of the voltage of the capacitor C may be prevented.

Figure 7:
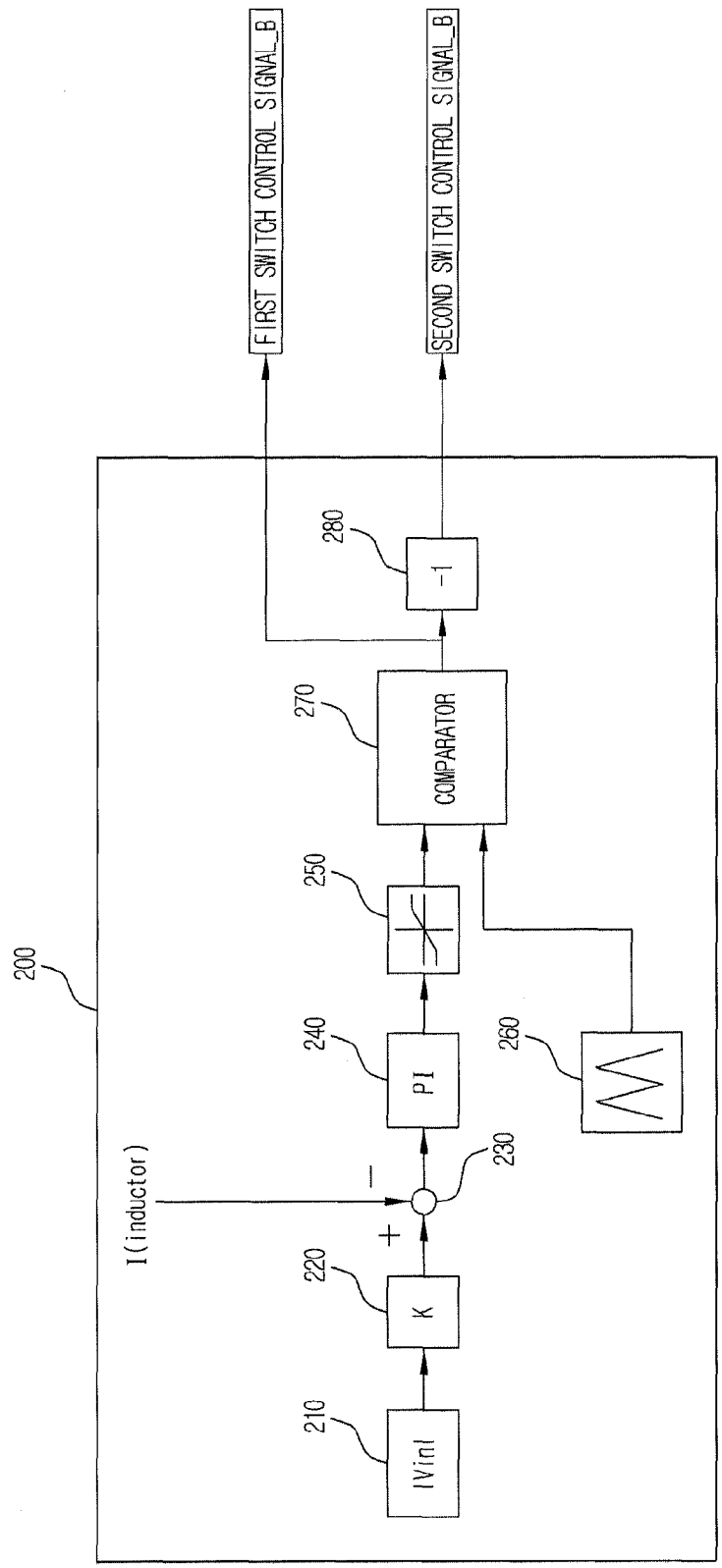
FIG. 7 illustrates a power factor control block.

FIG. 7 illustrates a power factor control block. The power factor control block 200 is referred to as a block configured to generate a switching control signal to correct the power factor after the voltage Vdc of the capacitor C of the output terminal. That is, the power factor control block 200 is a portion that generates a switching control signal when the boost converter unit 120 is operated as the power factor correction circuit. A "first switch control signal_B" is referred to as a first switch control signal that is generated at the power factor control block 200, and "second switch control signal_B" is referred to as a second switch control signal that is generated at the power factor control block 200.

An exemplary embodiment has a limiting of the inrush current as an objective. Instead of the power factor control algorithm illustrated on FIG. 7, another power factor control algorithm may be embodied at the power factor control block 200.

As illustrated on FIG. 7, the power factor control block 200 includes an absolute value calculator 210, a scaler 220, an adder-subtracter 230, a proportional-integral controller 240, a limiter 250, a carrier signal generator 260, a comparator 270, and a NOT operator 280.

The absolute value calculator 210 calculates the absolute value of an AC voltage Vin (an input voltage).

The scaler 220 reduces the size of an input voltage signal by multiplying the absolute value of the input voltage Vin, which is calculated through the absolute value calculator 210, by a scaling factor K ($0<K<1$).

The adder-subtracter 230 calculates the difference between the output signal of the scaler 220 and the current signal that flows at the inductor L.

The proportional integral (PI) controller 240 controls the difference of the output signal of the scaler 220 and the current signal that flows at the inductor L.

The limiter 250 limits the size of the output signal of the proportional integral controller 240 at a predetermined level.

The carrier signal generator 260 generates a carrier signal provided in a shape of a triangular wave having a certain frequency and a size (amplitude) that continues the increasing/decreasing in between about "0" (zero) and a certain value.

The comparator 270 compares the output signal of the limiter 250 with the carrier signal generated through the carrier signal generator 260, and if the output signal of the limiter 250 is larger than the carrier signal, a signal "1" is output as the first switch control signal_B (the first switch control signal_B=1), and if the output signal of the limiter 250 is smaller than or equal to the carrier signal, a signal "0" is output as the first switch control signal_B (the first switch control signal_B=0).

The NOT operator 280 inverts the output signal (the first switch control signal_B) of the comparator 270, and outputs the inverted output signal as the second switch control signal_B. That is, the NOT operator 280, if the output signal of the comparator 270 is "0" (zero), outputs a signal "1" as the second switch control signal_B (the second switch control signal_B=1), and if the output signal of the comparator 270 is "1", the NOT operator 280 outputs a signal "0" as the second switch control signal_B (the second switch control signal_B=0).

The boost converter unit 120 replaces a diode of the conventional boost converter with the second switch SW2, and thus when the boost converter unit 120 is operated as the power factor correction circuit, a switching control with respect to the second switch SW2 is needed. A method for controlling the ON/OFF of the first switch SW1 and the second switch SW2 at the power factor controlling mode includes operating the first switch SW1 and the second switch SW2 in a complementary way, and as illustrated on FIG. 7, by inverting the first switch control signal_B, the second switch control signal_B is generated.

Figure 8:
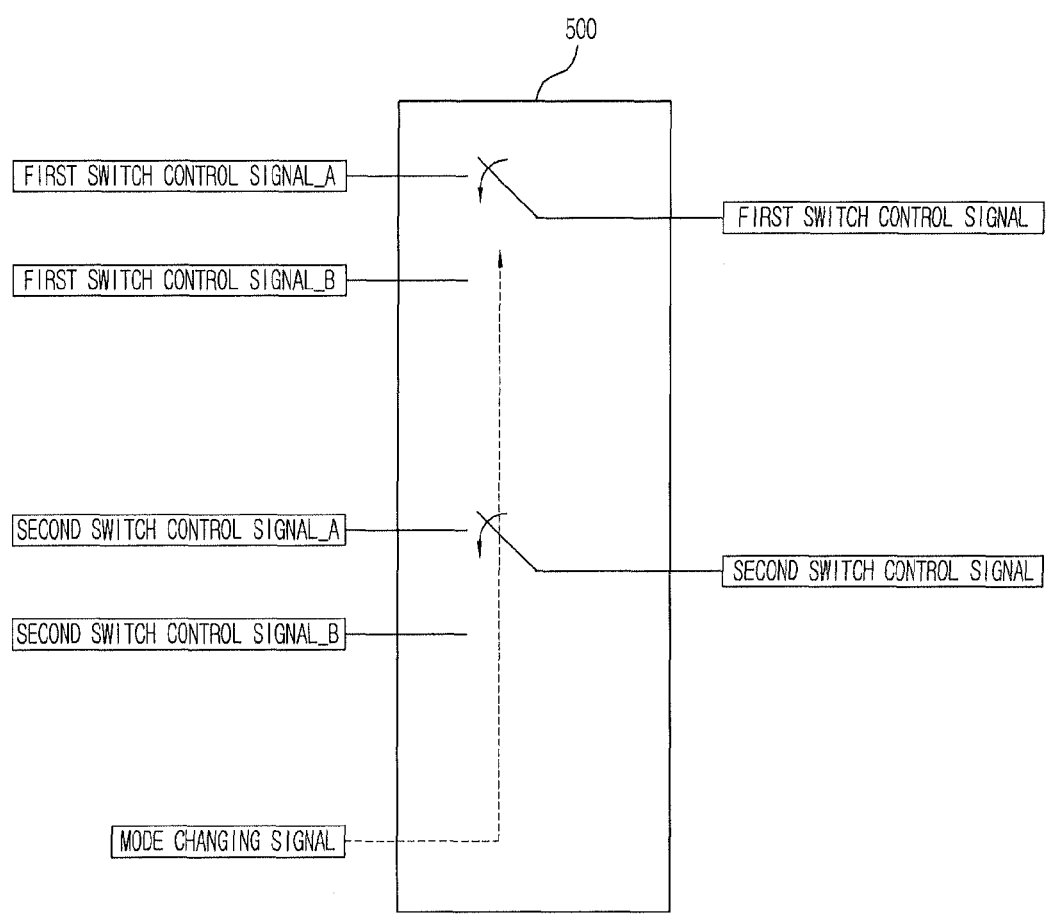
FIG. 8 an exemplary operation of a multiplexer.

FIG. 8 illustrates an exemplary operation of a multiplexer. The multiplexer 500 is referred to as a block that selectively outputs the control signals, which are input from the power factor control block 200 and the inrush current control block 300, according to the control mode. That is, depending on whether the boost converter unit 120 is operated as the inrush current limiting circuit or as the power factor correction circuit, the switching control signal to be finally output to the first signal SW1 and the second signal SW2 is selected.

As illustrated on FIG. 8, the multiplexer 500, as the input signal, receives the first switch control signal_A (the output signal of the inrush current control block), the first switch control signal_B (the output signal of the power factor control block), the second switch control signal_A (the output signal of the inrush current control block), the second switch control signal_B (the output signal of the power factor control block), and the mode changing signal (the output signal of the timer at an inside the inrush current limiting block). The multiplexer 500, as the output signal, transmits the first switch control signal and the second switch control signal to the first switch SW1 and the second switch SW2, respectively.

The selective output operation of the control signals that the multiplexer 500 performs are determined by the mode changing signal. When the mode changing signal is "0", that is, in a case when the boost converter unit 120 is operated as the inrush current limiting circuit, the multiplexer 500 outputs the first switch control signal_A as the first switch control signal, and outputs the second switch control signal_A as the second switch control signal. When the mode changing signal is "1", that is, in a case when the boost converter unit 120 is operated as the power factor correction circuit, the multiplexer 500 outputs the first switch control signal_B as the first switch control signal, and outputs the second switch control signal_B as the second switch control signal.

Figure 9:
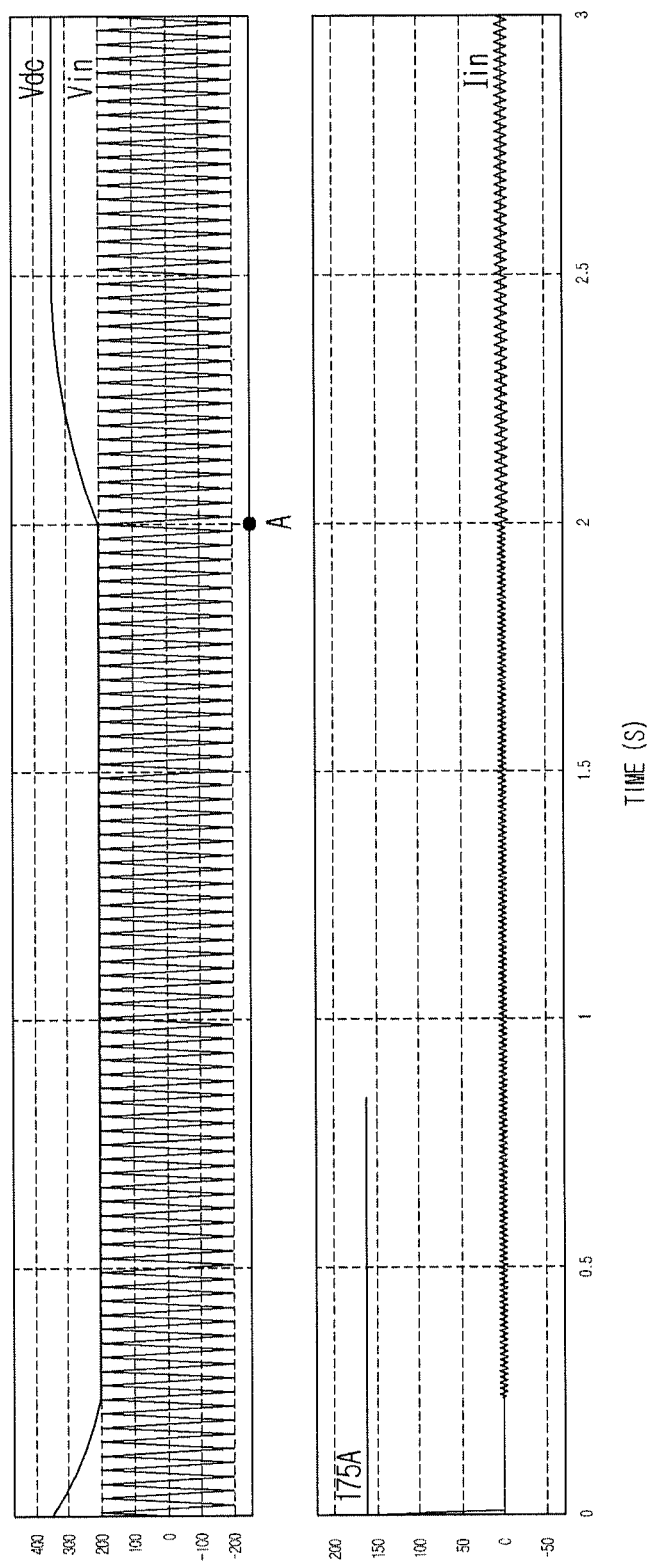
FIG. 9 illustrates an input voltage Vin, an output voltage Vdc, and a signal waveform of a capacitor current Iin when an inrush current is not limited.

FIG. 9 illustrates an input voltage Vin, an output voltage Vdc, and a signal waveform of a capacitor current Iin at the time of when an inrush current is not limited.

By examining the initial operation of an AC-DC converter having a diode bridge rectifier and a boost converter, the signal waveform as illustrated on FIG. 9 may be obtained. A case in which the AC-DC converter is supplied with a 60 Hz AC power having a peak voltage value of 200V while using circuit components of the AC-DC converter including an inductor of 2 mH, a capacitor of 2000 uF, and a resistance of 200Ω is given as an example. In the case as such, to charge the capacitor C at an initial stage, the inrush current reaching nearly at about 175 A is generated. In addition, by the inrush current, the capacitor voltage of the output terminal is also increased up to about 330V, which is higher than the rectified peak voltage of 200V, and is decreased slowly to at about 200V. The inrush voltage at such level is the size that may damage the diode bridge rectifier.

Figure 10:
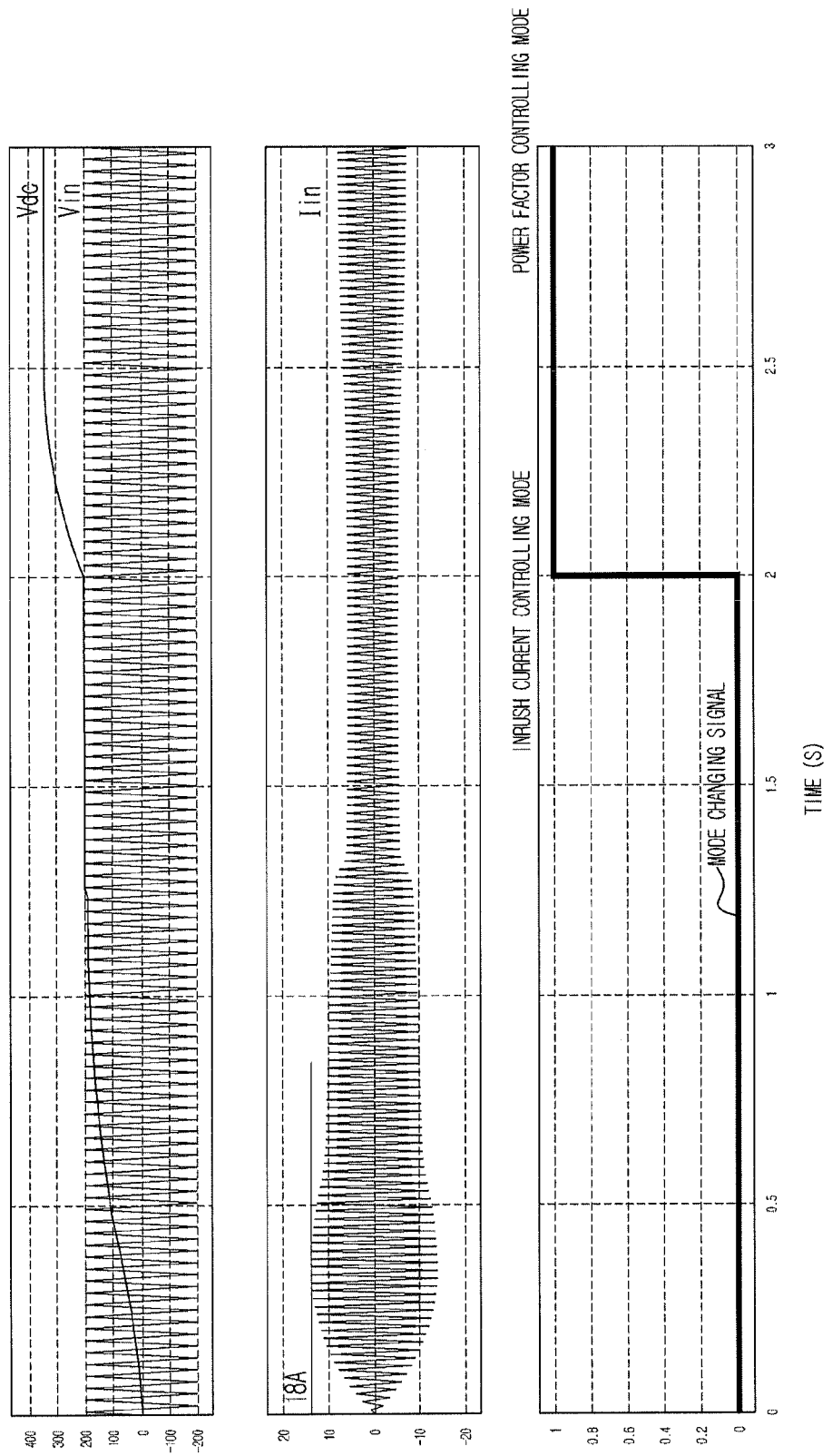
FIG. 10 illustrates an input voltage Vin, an output voltage Vdc, and a signal waveform of a capacitor current Iin when an inrush current is limited by using the inrush current control block.

FIG. 10 illustrates an input voltage Vin, an output voltage Vdc, and a signal waveform of a capacitor current Iin when the inrush current is limited by using the inrush current control block illustrated on FIG. 3.

The frequency of the carrier signal is set at about 1 kHz, and as the size of the reference signal is increased from 0 to 100 for 1.1 seconds, the capacitor C is slowly charged until for 1.1 second and the peak voltage is reached up to about 200V. By the switching, the inrush current is dispersed, so that the case having the largest size thereof is limited to about 18 A. The outcome as such is within the normal range of the operation of the diode bridge in a normal state, and the diode bridge rectifier may operate without being damaged.

After operating the boost converter unit 120 as the inrush current limiting circuit, the boost converter unit 120 is operated as the power factor correction circuit by setting the mode changing signal at "1" at around 2 secs, and thus the power factor correction function is performed in a satisfactory manner.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. An alternating current to direct current (AC-DC), comprising:
    a rectifying unit configured to rectify an AC voltage that is being input;
    a boost converter unit connected to the rectifying unit and provided with a single inductor, a first switch, and a second switch formed thereto;
    a smoothing unit configured to smooth the voltage passing through the boost converter unit; and
    a control unit configured to control an ON/OFF control signal of the first switch and the second switch and control an ON/OFF of the first switch and the second switch such that the boost converter unit is operated as a power factor correction circuit or as an inrush current limiting circuit,
    wherein the control unit comprises:
        a power factor control block to generate an ON/OFF control signal of the first switch and the second switch such that the boost converter unit performs a power factor controlling mode that operates as the power factor correction circuit;
        an inrush current control block to generate an ON/OFF control signal of the first switch and the second switch such that the boost converter unit performs an inrush current controlling mode that operates as the inrush current limiting circuit; and
        a multiplexer to select one of the control signal generated through the power factor control block and the control signal generated through the inrush current control block, and to transmit the selected signal to the first switch and the second switch.

2. The AC-DC converter of claim 1, wherein the inrush current control block comprises a first switch control signal generator to generate the ON/OFF control signal of the first switch, and a second switch control signal generator to generate the ON/OFF control signal of the second switch,
    wherein the second switch control signal generator, comprises:
        a reference signal generator configured to generate a reference signal that is increased in amplitude as time passes, and maintains a certain value in amplitude after a predetermined time is passed;
a carrier signal generator configured to generate a carrier signal in a shape of a triangular wave having a fixed frequency; and
a comparator configured to generate a control signal of the second switch by comparing the reference signal with the carrier signal.

3. The AC-DC converter of claim 2, wherein the inrush current control block further comprises a timer configured to generate a mode changing signal to change from the inrush current controlling mode to the power factor controlling mode if an established time is passed from a point of time when the reference signal is started with maintaining the certain value.

4. The AC-DC converter of claim 2, wherein when the inrush current controlling mode is being performed, the first switch control signal generator generates an OFF control signal of the first switch.

5. The AC-DC converter of claim 4, wherein when the inrush current controlling mode is being performed, the comparator at an inside the second switch control signal generator generates an ON control signal of the second switch if the reference signal is larger than the carrier signal, and if the reference signal is equal to or smaller than the carrier signal, the comparator at an inside the second switch control signal generator generates an OFF control signal of the second switch.

6. The AC-DC converter of claim 1, wherein the inrush current control block comprises a first switch control signal generator to generate an ON/OFF control signal of the first switch, and a second switch control signal generator to generate an ON/OFF control signal of the second switch, and
wherein the second switch control signal generator, comprises:
a reference signal generator configured to generate a reference signal in a form of a step that maintains a predetermined value in amplitude, and changes to a certain value in amplitude after a predetermined time is passed;
a carrier signal generator configured to generate a carrier signal in a shape of a triangular wave having a variable frequency; and
a comparator configured to generate a control signal of the second switch by comparing the reference signal with the carrier signal.

7. The AC-DC converter of claim 6, wherein the inrush current control block further comprises a timer configured to generate a mode changing signal to change from the inrush current controlling mode to the power factor controlling mode if an established time is passed from a point of time when the reference signal is started changing to a value that is greater than the predetermined value.

8. The AC-DC converter of claim 6, wherein when the inrush current controlling mode is being performed, the first switch control signal generator generates an OFF control signal of the first switch.

9. The AC-DC converter of claim 8, wherein when the inrush current controlling mode is being performed, the comparator at an inside the second switch control signal generator generates an ON control signal of the second switch if the reference signal is larger than the carrier signal, and if the reference signal is equal to or smaller than the carrier signal, the comparator at an inside the second switch control signal generator generates an OFF control signal of the second switch.

10. The AC-DC converter of claim 1, wherein the rectifying unit is formed with a diode bridge.

11. The AC-DC converter of claim 1, wherein each of the first switch and the second switch is implemented using an Insulated Gate Bipolar Transistor (IGBT).

12. A method to convert alternating current to direct current, comprising:
rectifying an input AC voltage;
generating an ON/OFF control signal to control a first switch and a second switch such that a boost converter unit performs a power factor controlling mode that operates as the power factor correction circuit;
generating an ON/OFF control signal of the first switch and the second switch such that the boost converter unit performs an inrush current controlling mode that operates as the inrush current limiting circuit;
selecting one of the control signal generated;
transmitting the selected signal to the first switch and the second switch;
controlling an ON/OFF of the first switch and the second switch based on the generated control signal received; and
smoothing the converted voltage.

* * * * *